Figure 3:
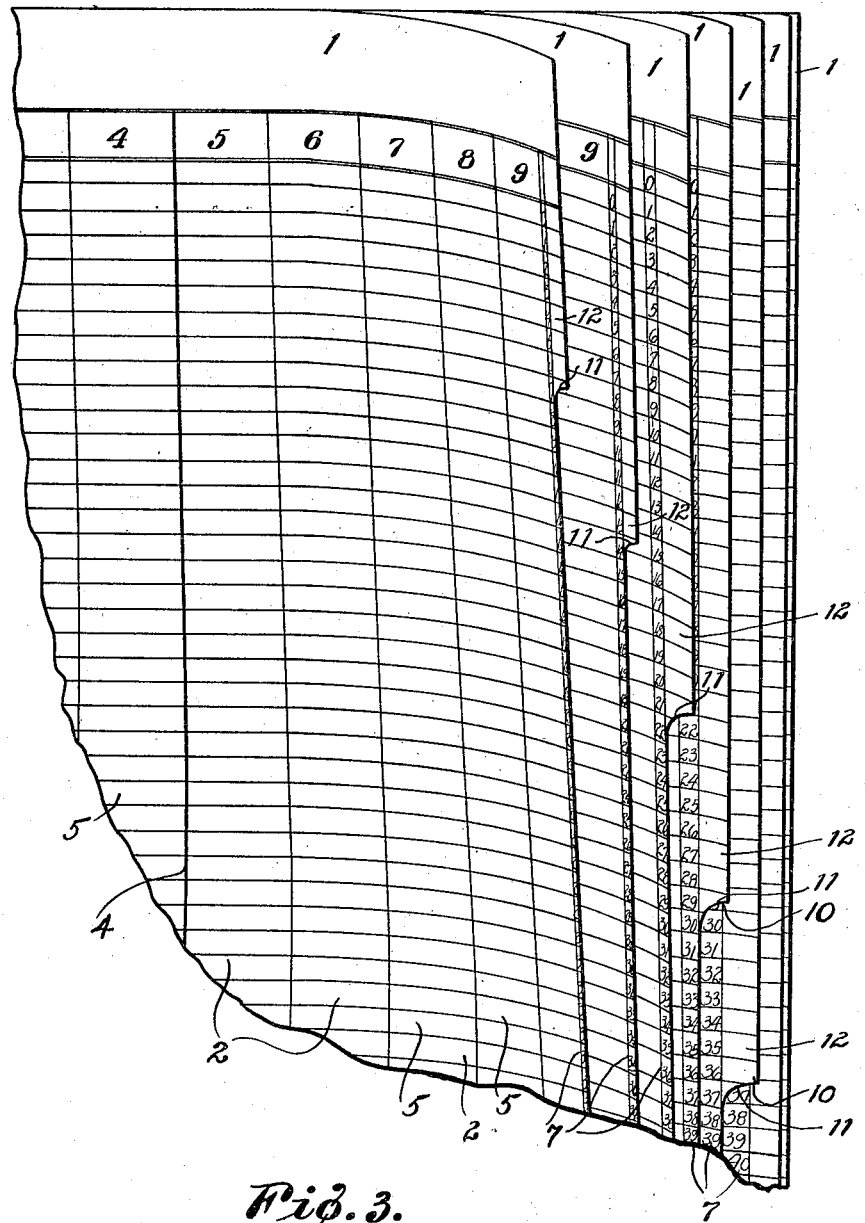

July 31, 1923.

O. L. MOORE

INDEX FOR NUMBERS

Filed Jan. 3, 1921

Inventor:
Osborne Lee Moore,
By Hugh K. Wagner,
Atty.

July 31, 1923.

O. L. MOORE

INDEX FOR NUMBERS

Filed Jan. 3, 1921

Inventor:
Osborne Lee Moore,
By Hugh K. Wagner.
Atty.

July 31, 1923.

O. L. MOORE

INDEX FOR NUMBERS

Filed Jan. 3, 1921

1,463,656

3 Sheets-Sheet 3

Inventor:
Osborne Lee Moore,
By Hugh K. Wagner,
Att'ys.

Patented July 31, 1923.

1,463,656

UNITED STATES PATENT OFFICE.

OSBORNE LEE MOORE, OF JEFFERSON, MISSOURI.

INDEX FOR NUMBERS.

Application filed January 3, 1921. Serial No. 434,643.

*To all whom it may concern:*

Be it known that I, OSBORNE LEE MOORE, a citizen of the United States, residing at the city of Jefferson, in the county of Cole and State of Missouri, have invented certain new and useful Improvements in Indexes for Numbers, of which the following is a specification.

This invention is a means for keeping records wherever a double or otherwise plural identifying number is connected with the same object, as, for instance, in the case of motor-cars, excavating machines, traction engines, watches, revolvers, typewriters, multigraph machines, adding machines, etc.

By law in some jurisdictions, the secretary of state or other officer is required to record the motor number in connection with the car number or license number of each motor-vehicle for which a license is issued. Such motor numbers are the manufacturers' numbers. The license number is the number of the license tag and license issued by the proper authority. Magnetos, distributors, crank-cases, horns, etc., bear distinguishing numbers, also, which can, if desired, be recorded in this manner.

The structure herein illustrated and described permits many permutations, either as to the main key series of numbers or the numbers recorded under such key. In other words, the key numbers may be based on one subject-matter or another. Furthermore, the arrangement of main and subsidiary numbers may, if desired, be in the nature of a direct and inverted index. In other words, in the direct index, a continuous series of numbers (as, for instance, license numbers) receives thereunder the entries of corresponding motor numbers or car numbers or both. In the inversion of such index, a series of car numbers or of motor numbers may be made the key and the corresponding other kind of numbers or the license numbers or both may be recorded thereunder. Again, if two or more kinds of numbers are recorded under the main key series of numbers, two or more inverted indexes may be prepared, using blanks and the structure herein set forth.

The recent great increase of the number of motor-vehicles and the like, the growth in the number of accidents thereby, and the large and increased volume of crime in which they figure all make the keeping of accurate information assisting in their identification and tracing more necessary and render it important that such data shall be kept in easily intelligible and accessible form, so that a long-distance telephone police inquiry or the like can be answered with the least possible delay.

The record blanks and books hereby provided are suitable not alone for state offices, such as that of the secretary of state, but for the offices of municipalities and local police headquarters and the like. They are suitable not alone for motor-vehicles, but, also, for other purposes. They may be used as identifying means for detecting criminals by the preservation of the corresponding watch-case and watch-movement numbers and the names of manufacturers and purchasers etc. They may, also, be used by manufacturers of excavating machines, in which the machine bears one number and the engine another. Such records enable manufacturers to keep track of their machines either when only partly paid for or when stolen and, also, in filling orders for repair parts.

Persons skilled in keeping police records will perceive a multitude of uses for these records, greatly aiding in the solution of crimes and detection of criminals—for instance, by recording numbers of revolvers or automatic pistols and their parts, the numbers of typewriters, adding machines, and the like and their parts, and of other portable and frequently-stolen articles.

Large manufacturers of watches, insurance companies (who trace stolen articles), and many others having to do with numbered articles will derive benefit from the use of these record blanks and books.

In the accompanying drawings forming part of this specification, in which like numbers of reference denote like parts wherever they occur, Figure 1 represents one page or sheet of the blank;

Figure 2 represents a plurality of such sheets arranged in superimposed relation to form the pages of a book; and Figure 3 is a perspective view of a plurality of sheets or pages of such blanks, with a thumb or catch index in the margin.

For the purposes of an example, we shall assume that the blanks illustrated in the drawings are to be used in keeping data concerning motor-cars. We shall assume that the top row of numbers represents motor-car license numbers. The numbers of this row are arranged in groups or series which we shall call the key series, each series comprising key-numbers ranging from 0 to 9, as illustrated. As above explained, this key series may be derived from other subject-matter or sources than from license numbers.

Superimposed above the said key series of numbers is a blank space 1, adapted to receive in writing by pen or pencil or the impression of a rubber stamp or the like group numbers characterizing the entries thereunder as "10,000" or "100,000" or "1,350,000" or what not. In Figure 1, the figures 340,000 and 341,000 represent such group numbers.

A convenient, and, therefore, preferable, division of each page or sheet is, as shown in the drawings, into two groups of spaces 2, each group being headed by a group number and adapted to receive one thousand numbers. Each of the said groups is separated from the next adjoining one by a column of supplementary key numbers 3 and is itself divided in the middle by an extra-thick or black line 4, which has the effect of assisting vision in picking out the right or proper column 5 under the key series of numbers. Instead of being an extra-heavy line of the same color of the rest of the ruling it may be of a different color.

Each number in the key series of numbers heads a column 5. Each cross row of spaces 2 is designated by one of the supplementary key-numbers in the column and similarly in the columns 6 and 7, respectively, the said numbers ranging from 0 to 99. Thus, each space 2 belongs to some license number and is intended to receive some motor number written or stamped or pasted therein, the information recorded being that the motor number of the motor in the car for which license so-and-so was issued is thus-and-so. At least, one column of numbers, such, for instance, as columns 6 and 3, is necessary for each of the above-mentioned groups of spaces, but column 7, or its equivalent, is highly desirable, also, as an eye-steadier or as a means of locating the appropriate space under one of the higher key numbers in the key series. For the lefthand group of spaces 2 this function is performed by column 3.

At the lower part of the sheet is left a plain space 8, adapted to be fingered in turning the pages and to become dog's eared (if need be), rather than the lower part of the record portion.

The eyelets 9 are adapted to receive binding devices for attachment of individual sheets such as herein illustrated and described into a looseleaf book. The sheets printed and ruled as herein illustrated and described may, however, be bound together in the form of a regularly-bound permanent book. The looseleaf form will in most instances be found preferable, because no more pages need be purchased or used than are necessary and their number can be added to from time to time when needed; whereas, some unnecessary pages would need to be included in a permanently-bound book for fear of inadequate provision for expansion. Another advantage of the looseleaf form is that the marginal index 10 can be best cut and formed when loose leaves are used.

One advantage of this form of index is that a supply of sheets can be procured without any notches therein for the index 10. This effects economy in purchasing. Then they can be added to the book gradually as required. Thus the book may be started as a record for 100,000 numbers, but can grow to 1,000,000 without inconvenience, because as many sheets as ultimately are necessary can be added gradually. The cut-outs 11 can be made of any desired length or shortness, so that the lowest part of each index projection 12 projects from underneath the one immediately thereabove and all others thereabove, thus allowing the index numbers on each such tab 12 to be read. Each projection 12 affords space on which is written the group number appearing above the first group of entries on the lefthand sheet or page illustrated in Figure 1 and the closing number on the righthand sheet or page associated therewith. When the book is started it may consist of one sheet. The cut-out 11 will be very long, almost the length of the page from top to bottom and the remaining tab or projection 12 will be quite short, as clearly appears in Figure 2. The cut-out 11 in the second page will be slightly shorter and the projection 12 slightly longer, and so on. If a whole book were purchased providing possible space for 1,000,000 numbers, and yet only one-tenth or one-quarter of it were used, great waste would be the result, whereas by adding only one sheet at a time and making the projections 12 of only such size as is necessary and will permit any additional ones to show, a book is ultimately produced that is only the exact size required. Figure 2 illustrates a plurality of pages providing a book for indexing 48,000 numbers (there are twelve index tabs 12, and each sheet bears spaces and numbers for indexing two thousand numbers, and each tab 12 serves for two sheets); but this is only illustrative, and the number of groups of 1,000 numbers on a sheet may be increased and the size of the tabs 12 diminished, so as to permit any number of tabs 12 to project from underneath each other.

It will be understood from the manufacturing standpoint that the sheets are quite simple to print, because no numbers higher than 99 are printed and the cut-outs 11 are made by the user of the sheets to construct a book exactly suited to the individual case.

This last statement may be true whether the sheets are furnished by the manufacturer loose or bound. The eyelets 9 may be punched or formed either by the manufacturer or the user. The group numbers written in the space 1 will characterize each series of integers appearing thereunder, as, for instance, if in Figure 1 there be written in space 1 the numbers 340,000 and 341,000, it will be understood that the first column under "0" on that page relates to numbers from 340,000 to 340,099. Each successive column increases the number by 100 so that the closing number at the bottom of the page should be 341,999. This effects the above-mentioned economy in printing and purchasing, as each sheet is complete in itself to utilize any key-number, which in turn transforms any of the ordinary series of integers into a special key series for the purposes hereinabove described.

The use of the blank to record, for example, the motor numbers of cars corresponding to certain license numbers is illustrated in Fig. 1, by reference to which figure it will be observed that the number "241" entered in the space of the first column under 3, in alinement with minor key series #63, is the motor number corresponding to the license number 340.363. Similarly, the motor numbers of cars having license numbers 340.381; 340,631 and 340,845 are found to be entered as 703; 125 and 40, respectively.

The binding through eyelets 9 may be of any suitable kind, either temporary or permanent, but the eyelets 9 are preferably formed with a slit 13, enabling the removal of a sheet. This slit 13 will be omitted for permanent binding, and other modes of binding may be used, as, for instance, the various forms of stitching used in ordinary blankbooks.

Each number in the key series is located at the top of a ruled column that it dominates for major indication, the said column being divided by ruling into spaces 2 adapted to receive written or stamped or pasted numbers and each of the said subdivisions or spaces 2 being controlled for minor indication by a printed number in alinement therewith—preferably in horizontal alinement, there being a plurality of such spaces 2 (preferably one hundred in number) in alinement (preferably vertical alinement) with each number of the said key series and a plurality of such spaces 2 in alinement with each number used for minor indication, there being preferably one such space 2 for each of the numbers of the main key series and there being preferably ten such numbers, repeated as often as may be desired on each sheet or page and there being preferably one hundred numbers, from 0 to 99, in a vertical column for such minor indication, one of the said numbers being opposite each row of spaces 2.

Having thus described this invention, I hereby reserve the benefit of all changes in form, arrangement, order, or use of parts, as it is evident that many minor changes may be made therein without departing from the spirit of this invention or the scope of the following claims.

I claim:

1. A record sheet ruled to provide a series of columns numbered progressively from zero, each column being subdivided into a predetermined number of entry spaces also numbered progressively from zero, each space representing an identifying number the terminal integer of which is designated by the number of the space and the next preceding integer designated by the number of the column, and a denominating number printed on the sheet and fixing the value of the column numbers.

2. In a record book, an entry sheet ruled to provide a group of entry spaces arranged in columns, each space being representative of an identifying number, a minor key series of numbers for indicating the value of each space with respect to its sequence in the column, a main key series of numbers for indicating the value of each column with respect to its sequence in the group, and a group-characterizing number for indicating the value of the group with respect to the entry sheet.

3. In a record book, an entry sheet ruled to provide one or more groups of entry spaces with the spaces of each group arranged in columns and being respectively representative of an identifying number, main and minor key series of numbers for each group, each number in the main key series being located at the top of a column of spaces that it dominates for major indication and each number in the minor key series being in alinement with a cross row of spaces which it controls for minor indications, and a group-denominating number to be read in connection with the main and minor key numbers jointly designating a common space for characterizing the value of the identifying number represented by such space.

4. In a record book, an entry sheet ruled to provide one or more groups of one-thousand entry spaces arranged in columns of one-hundred spaces each, each space being representative of an identifying number, a minor series of key numbers designating successively the spaces of each column, there being a key number in alinement with each cross row of the spaces and serving to represent the terminal integer of the identifying number corresponding with each space in the said row, said minor series including numbers from 0 to 99, a main series of key numbers heading each group with each number in the said series heading a column of spaces and representing the integer (of the identifying number) next preceding the terminal integer indicated by the minor key number of each space in the column, said main series including numbers from 0 to 9, and a denominating number for each group representing the initial integer of the identifying number corresponding to each space in the group.

In testimony whereof I hereunto affix my signature.

OSBORNE LEE MOORE.